United States Patent
Judy (10) Patent No.: US 9,293,050 B2
(45) Date of Patent: Mar. 22, 2016

(54) SYSTEM AND METHOD FOR TACTICAL VIEWING OF DATALINK MESSAGES

(71) Applicant: Honeywell International Inc., Morristown, NJ (US)

(72) Inventor: Victoria Judy, Cave Creek, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 192 days.

(21) Appl. No.: 14/099,074

(22) Filed: Dec. 6, 2013

(65) Prior Publication Data

US 2015/0161896 A1   Jun. 11, 2015

(51) Int. Cl.
G08B 21/00 (2006.01)
G08G 5/00 (2006.01)
G01C 23/00 (2006.01)
G06F 3/041 (2006.01)

(52) U.S. Cl.
CPC ............. G08G 5/0013 (2013.01); G01C 23/00 (2013.01); G06F 3/041 (2013.01); G08G 5/0021 (2013.01); G06F 2203/0381 (2013.01)

(58) Field of Classification Search
CPC .......................... G08G 5/0013; G08G 5/0021
USPC ...................... 340/945–983; 701/3
See application file for complete search history.

(56) References Cited

U.S. PATENT DOCUMENTS

| | | | |
|---|---|---|---|
| 5,732,384 | A | 3/1998 | Ellert et al. |
| 2005/0288831 | A1 | 12/2005 | Lusardi et al. |
| 2008/0163093 | A1 | 7/2008 | Lorido |
| 2010/0188266 | A1 | 7/2010 | Judd et al. |
| 2011/0137998 | A1 | 6/2011 | Judd et al. |
| 2012/0066617 | A1 | 3/2012 | Gupta et al. |
| 2012/0078447 | A1 | 3/2012 | McGuffin et al. |
| 2012/0079398 | A1 | 3/2012 | McGuffin et al. |

OTHER PUBLICATIONS

"The ATC Interactive Radar Simulator ATC2K Operations Handbook", Aug. 5, 2002, pp. 1-75, Publisher: Copyright by Vic Day.
(Continued)

Primary Examiner — Jeffery Hofsass
(74) Attorney, Agent, or Firm — Fogg & Powers LLC (57) ABSTRACT

An alerting system and method for producing tactical views of datalink messages is provided. The system comprises a datalink application processor configured to receive and decode an uplink datalink message. The datalink application processor also includes a datalink message manager. The system also includes a control processor in operative communication with the datalink application processor and configured to communicate with the datalink message manager. A display unit is in operative communication with the control processor and is configured to show the uplink datalink message. The control processor is configured receive message data from the datalink message manager and output the message data to the display unit to generate an annunciation of the datalink message. The datalink message manager is configured to output display data for generating the datalink message in full based on a single forward field of view interaction by a user with the display unit.

19 Claims, 4 Drawing Sheets (56) References Cited

OTHER PUBLICATIONS

P.G.A.M. Jorna, "Human Machine interfaces for ATM: objective and subjective measurements on human interactions with future Flight deck and Air Traffic Control Systems", "Human centered design in aviation: validating operator behavior with future systems", 1997, pp. 1-20, Publisher: Netherlands Aerospace Laboratory, Published in: NL.

European Patent Office, Extended European Search Report from EP Application No. 14192741.8 mailed Apr. 28, 2015, from Foreign Counterpart of U.S. Appl. No. 14/099,074, Apr. 28, 2015, pp. 1-9, Published in: EP.

SYSTEM AND METHOD FOR TACTICAL VIEWING OF DATALINK MESSAGES

BACKGROUND

Existing mandates, scheduled mandates, as well planned or foreseeable mandates continue to expand the use of communications and clearances via datalink for air traffic control (ATC) of the aircraft. As functionality continues to expand, certification requirements specify there must be minimum human interactions required, such as no or minimal button pushes, and no or minimal heads down time in conjunction with ATC control over datalink.

It is important to reduce crew workload and provide a way of ensuring the accuracy and integrity of the communication. Clearances are becoming more complex and, when added to the complexities of the modern cockpit, it is becoming increasingly important to make access to and use of ATC datalink clearances as simple as clicking the microphone button as done in the traditional voice only cockpit.

Conventional ATC clearance interfaces such as Controller Pilot Data Link Communications (CPDLC) and Air Traffic Services (ATS) require the crew to be heads down looking at a control display unit (CDU) to obtain the clearance information. Based on several existing systems, up to five button push selections are required just to view the displayed clearance. While some systems have used graphical representations in a forward field of view display, access to screens in these systems requires multiple menus to be selected to bring up the desired clearance information.

SUMMARY

An alerting system and method for producing tactical views of datalink messages is provided. The system comprises a datalink application processor configured to receive and decode an uplink datalink message. The datalink application processor includes a datalink message manager. The system also includes a control processor in operative communication with the datalink application processor and configured to communicate with the datalink message manager. A display unit is in operative communication with the control processor and is configured to show the uplink datalink message. The control processor is configured receive message data from the datalink message manager and output the message data to the display unit to generate an annunciation of the datalink message. The datalink message manager is configured to output display data for generating the datalink message in full based on a single forward field of view interaction by a user with the display unit.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method for tactical viewing of datalink messages such as Air Traffic Control (ATC) uplink clearances in an aircraft cockpit is provided. In general, a non-dedicated window or display is provided for the purpose of flight crew alerting that provides a quick interface to allow display of the datalink messages. The present approach uses a visual alert that comes with the datalink message to display the message at the alerting location, or allows the flight crew to select the visual alert to activate the full display of the message with one button push.

In conventional aircraft cockpits, it is required to provide a forward field of view annunciation that an ATC clearance has arrived. The annunciation for ATC clearance in conventional aircraft systems is provided by a generic fixed information display, which can vary in location and look in a given cockpit. The present approach uses direct access of the forward field of view to allow a pilot to obtain the information in the clearance, removing or reducing head down time of the pilot. This improves pilot awareness and aids in reducing pilot work load. For example, the present technique allows for minimal crew action when using data sharing or direct linking to communicate with ATC personnel such as when using the Controller Pilot Data Link Communications (CPDLC) protocol or the Air Traffic Services (ATS) protocol. While the present technique can be implemented in a conventional crew alerting system, the technique can also be implemented in any type of popup display arrangement.

The present approach takes advantage of operational graphical screens that have the capability to recognize selections on the screen and execute software operations. In a display screen with this capability, a popup or other dedicated type of alert window can be shown on the screen when the annunciation is selected. As a Forward Field of View (FFoV) example, a selectable crew alerting message can be provided through the same alerting process that displays the annunciation. Alternatively, a conventional Multifunction Control Display Unit (MCDU) can be used to display a full message based on the selectable crew alerting message.

In a first aspect of the present method, a variable datalink uplink message such as clearance information is provided to the crew with the annunciation. Although clearances may be uplinked with multiple elements that include multi-word character strings, many uplinks are short in nature and are typically less than 50 characters. The present approach allows for a variable display of clearance information of up to a maximum number of characters. This allows the crew to quickly view short clearances with no action, or with a clear depiction understand that a more complex clearance has arrived that must be opened. For example, when the full message cannot be displayed, the remaining datalink of the message after the first x number of characters may be replaced with "..." or some other type of continuation indication. This gives the crew a quick idea of the content of the message that is waiting for them.

In a second aspect of the present method, access to the complete message and crew interactions are provided such that the crew can select the annunciation and open the complete message datalink in either a forward field of view display or on another human-machine interface (HMI) such as a Multifunction Control Display Unit (MCDU) without having to push any buttons on a heads down display. For example, when the crew selects the datalink display relating to an ATC clearance uplink, the message will open in its entirety and provide response selections. The open message may appear in a popup on the same display as the annunciation, on a different forward field of view display, or on a MCDU. In any of these implementations, the full clearance data and interaction appear when the annunciation is selected with no head down time. This second aspect of the present method can be implemented with a fixed datalink message as part of the annunciation, or can be implemented with a variable datalink message as part of the annunciation. The ATC datalink message is shown in full based on a single forward field of view interaction by a crew member with the display.

In various implementations, the fixed datalink messages or the variable datalink messages can be selected by the crew in an alerting window of a display, which can include a touch sensitive screen, a cursor, or side select buttons, depending on the hardware. A popup then appears in the alerting window with the expanded message and response selections. Crew action may then be completed in the popup by making appropriate selections. When the present technique is implemented with a crew alerting display, the crew will have looked at the crew alerting display already due to an aural alert that occurs with the annunciation, drawing their attention to the crew alerting display. In this way a complete ATC clearance may be addressed by the crew without the need for opening additional windows or even looking at a different display. Alternatively, the crew alerting display can backdrive a datalink window to be displayed automatically on another device (e.g., datalink window or MCDU) as an optional backup.

The present methods can be implemented primarily in software. In cockpits that have advanced operational graphical displays, the alert would have an underlying software component that when selected using a cursor control device or touch screen would recognize the selection of the alert which would hold an identification record and associated function. The selection would awaken the associated function with the identification record information and that software function would then take all of the software steps necessary to bring up the appropriate popup, with the appropriate information.

The present techniques can be implemented in existing systems that have significant amounts of legacy hardware, while minimizing changes to the existing hardware, as the majority of changes can be implemented in software. While the present method can be used with ATC messages as described, the method can also be used for other information alerts where there is variable data that can be produced on a display.

Further details of the present system and method are described hereafter with respect to the drawings.

Figure 1:
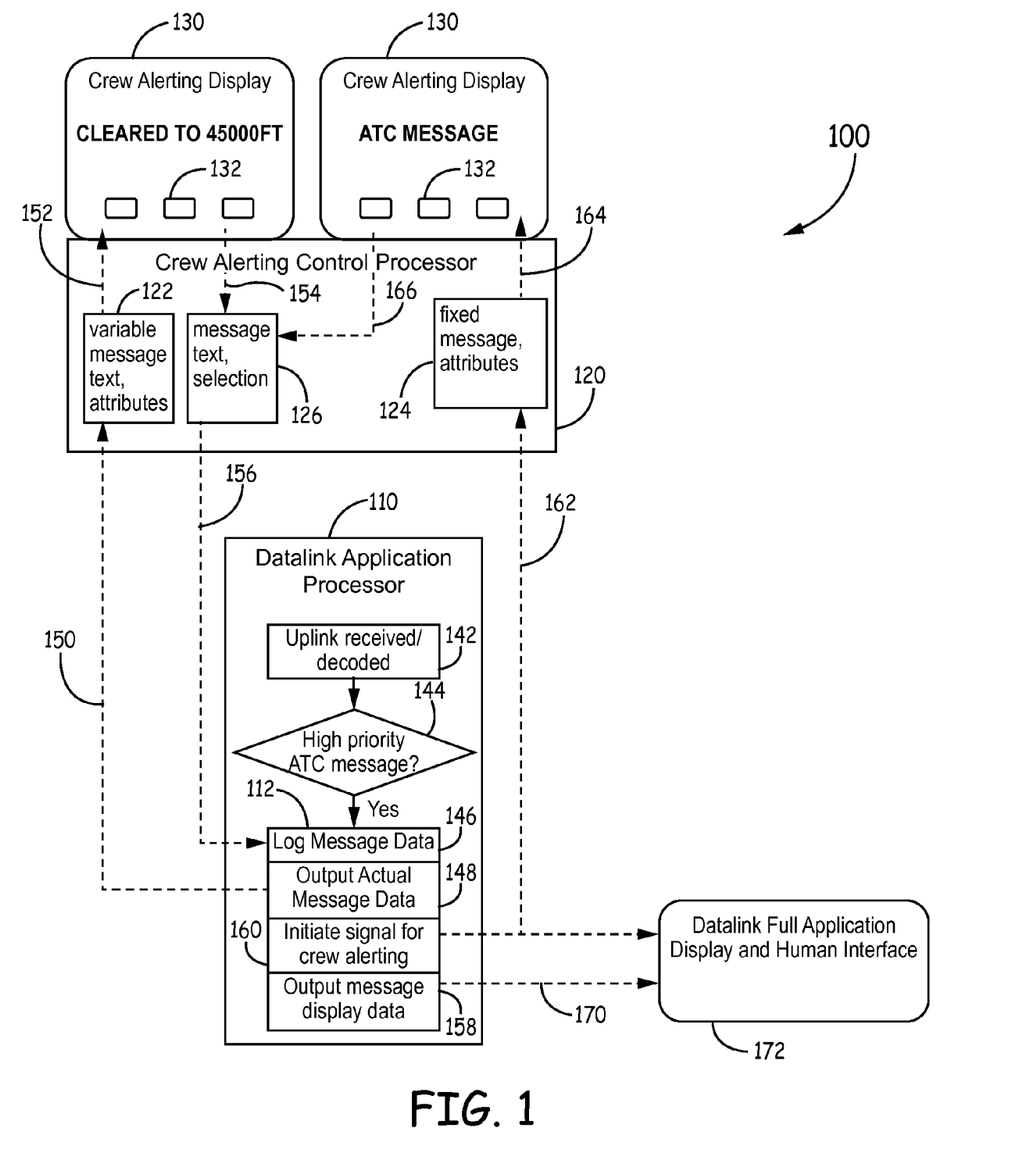
FIG. 1 is a block diagram of a system for tactical viewing of Air Traffic Control uplink messages.

FIG. 1 illustrates a system 100 for producing tactical views of ATC uplink messages. The system 100 includes a datalink application processor 110 configured to receive and decode uplink ATC datalink messages. A crew alerting control processor 120 is in operative communication with datalink application processor 110, and a crew alerting display unit 130 is in operative communication with control processor 120.

The datalink application processor 110 includes a datalink message manager 112 that provides textual information for displaying an uplink message to the crew. The control processor 120 includes a variable message processing module 122 or a fixed message processing module 124, as well as a message selection processing module 126. The display unit 130 can include a set of select buttons 132 or other crew selection capability.

During operation of system 100, datalink application processor 110 receives and decodes an uplink message (block 142), and determines if the uplink message is a high priority message such as an ATC message (block 144). If a high priority message is received, the message data is sent to datalink message manager 112 and logged for further processing (block 146).

When system 100 is implemented with variable datalink uplink message annunciation, the actual message data is output (block 148) with an alert signal 150 to control processor 120 and received by variable message processing module 122, which processes the uplink message data and provides message attributes. A message data signal 152 is then sent to display unit 130 for generating an annunciation of the actual datalink message, which can include an aural alert. As depicted in FIG. 1, the datalink message displayed can be a datalink clearance message such as CLEARED TO 45000FT, for example. The crew can then select the datalink uplink message on display unit 130 such as with a select buttons 132 to initiate communications with the ground such as WILCO (will comply), UNABLE, STANDBY, etc. A response signal 154 is sent back to control processor 120 and received by selection processing module 126, which outputs a selection signal 156 that is received by datalink message manager 112 for further processing. The datalink message manager 112 then outputs message display data (block 158) for generating the full datalink message on another external display device. For example, a display data signal 170 can be transmitted to a datalink full application display and human interface 172. The display unit 130 can clear the applicable onscreen datalink message upon the manual selection action by the crew.

When system 100 is implemented with fixed datalink message annunciation, a signal for crew alerting is initiated (block 160) by datalink message manger 112 and is output as alert signal 162 to control processor 120. The alert signal 162 can also be sent to the display and human interface 172 when used. The alert signal 162 is received by fixed message processing module 124, which provides message attributes (e.g., audio, color). A fixed message signal 164 is then sent to display unit 130 for generating an annunciation with the fixed datalink message, which can include an aural alert. As depicted in FIG. 1, the fixed datalink message reads "ATC MESSAGE" for example. The crew can then select the fixed datalink message on display unit 130 such as with select buttons 132 to view the full message. A response signal 166 is sent back to control processor 120 and received by selection processing module 126, which outputs selection signal 156 that is received by datalink message manager 112 for further processing. The datalink message manager 112 then outputs message display data (block 158) for generating the full datalink message, such as on display unit 130 or on another external display device, such as datalink full application display and human interface 172.

In the exemplary implementations that follow, various crew alerting systems that have interactive capabilities are described, in which the user may perform input selections that result in various actions. The systems interpret the input selections and can provide additional functionality, which may include sending data to external devices/functions and/or other alerting functions.

Figure 2A:
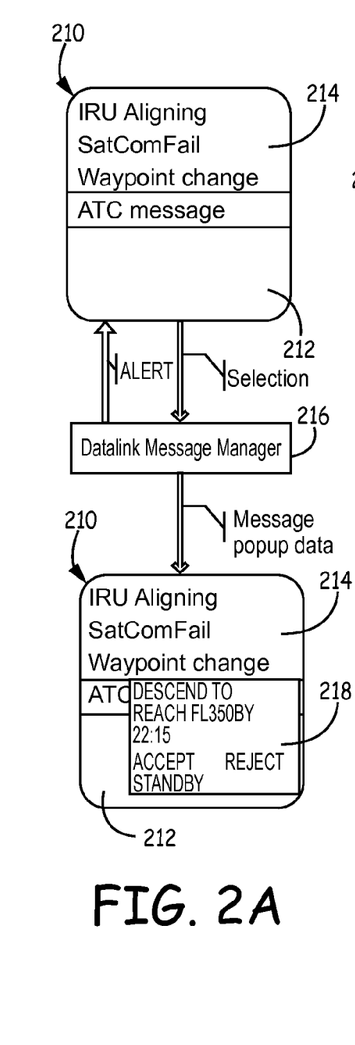
FIGS. 2A-2C illustrate various interactive Forward Field of View (FFoV) display architectures that are configured for fixed datalink messages according to alternative embodiments.
Figure 2B:
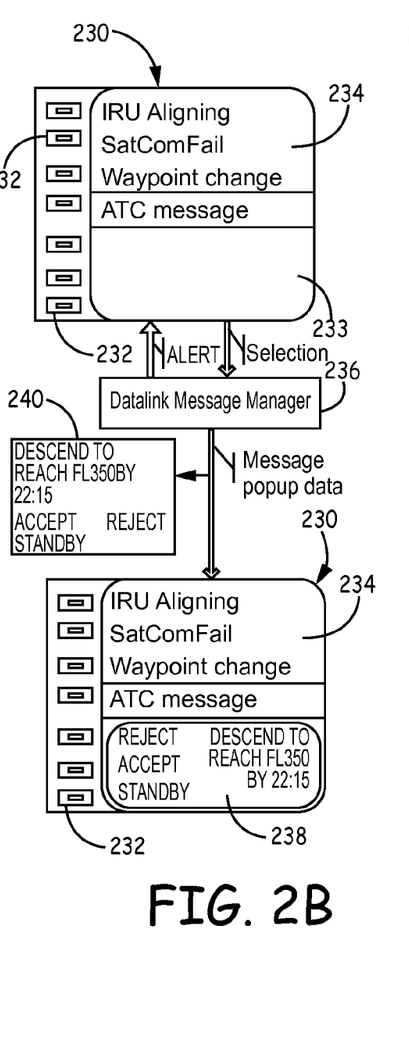
Figure 2C:
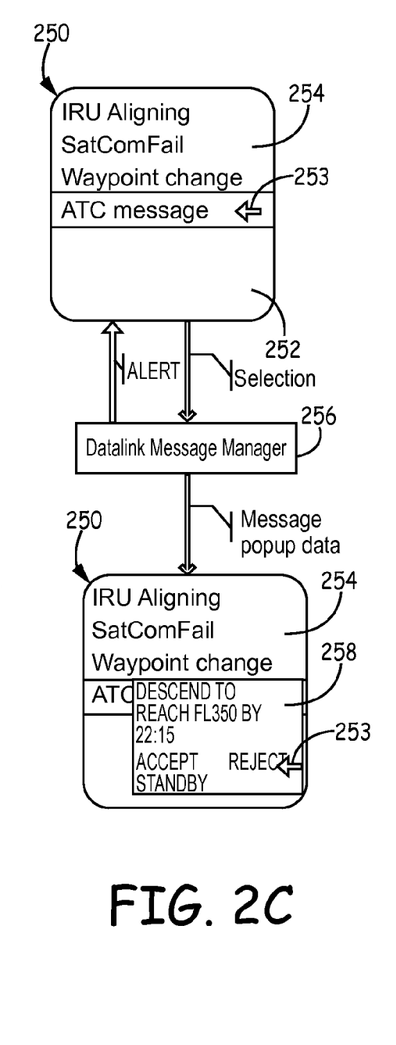

FIGS. 2A-2C illustrate various interactive FFoV display architectures that are configured for fixed datalink messages according to alternative embodiments. As shown in FIG. 2A, a display unit 210, which has a touch sensitive screen 212, lists various exemplary alerts in an alerting widow 214 that are provided by a datalink message manager 216, including "IRU Aligning" (IRU—inertial reference unit), "SatCom-Fail" (satellite communications failure), "Waypoint change", and "ATC message". If the "ATC message" is selected by the crew by touching screen 212 in the location where the "ATC message" is displayed, the selection is transmitted to datalink message manager 216, which generates message popup data. The message popup data is transmitted back to display unit 210 to generate a popup 218 in alerting window 214 with the expanded message in its entirety (e.g., DESCEND TO REACH FL350 BY 22:15, (FL350—flight level 35000 feet)). The popup 218 also includes response selections (e.g., ACCEPT, REJECT, STANDBY), which can be selected by touching screen 212 over the appropriate response selection.

As depicted in FIG. 2B, a display unit 230 includes line select buttons 232 that are associated with a screen 233. The display unit 230 lists various exemplary alerts in an alerting widow 234 that are provided by a datalink message manager 236, including the "ATC message" fixed text. If the "ATC message" is selected by the crew by pushing the corresponding line select button 232, the selection is transmitted to datalink message manager 236, which generates message popup data. The message popup data is transmitted back to display unit 230 to generate a popup 238 in alerting window 234 with the expanded message in its entirety (e.g., DESCEND TO REACH FL350 BY 22:15). The popup 238 also includes response selections (e.g., ACCEPT, REJECT, STANDBY), which can be selected by pushing the corresponding line select button 232. Alternatively, the message data can be directed to appear in an external popup 240 on another display that may execute button pushes.

As illustrated in FIG. 2C, a display unit 250, which includes a screen 252 that uses a line select cursor 253, lists various exemplary alerts in an alerting widow 254 that are provided by a datalink message manager 256, including the "ATC message" fixed text. If the "ATC message" is selected by the crew by using line select cursor 253, the selection is transmitted to datalink message manager 256, which generates message popup data. The message popup data is transmitted back to display unit 250 to generate a popup 258 in alerting window 254 with the expanded message in its entirety (e.g., DESCEND TO REACH FL350 BY 22:15). The popup 258 also includes response selections (e.g., ACCEPT, REJECT, STANDBY), which can be selected using line select cursor 253.

Figure 3A:
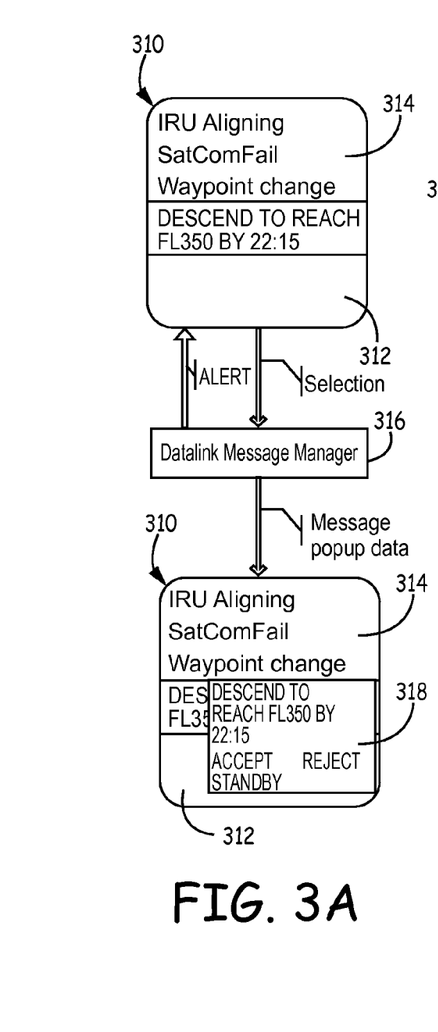
FIGS. 3A-3C illustrate various interactive FFoV display architectures that are configured for variable datalink messages according to alternative embodiments.
Figure 3B:
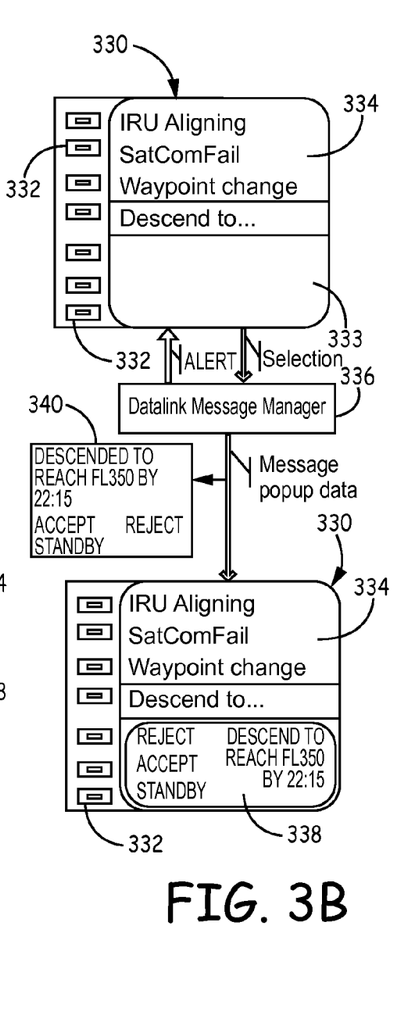
Figure 3C:
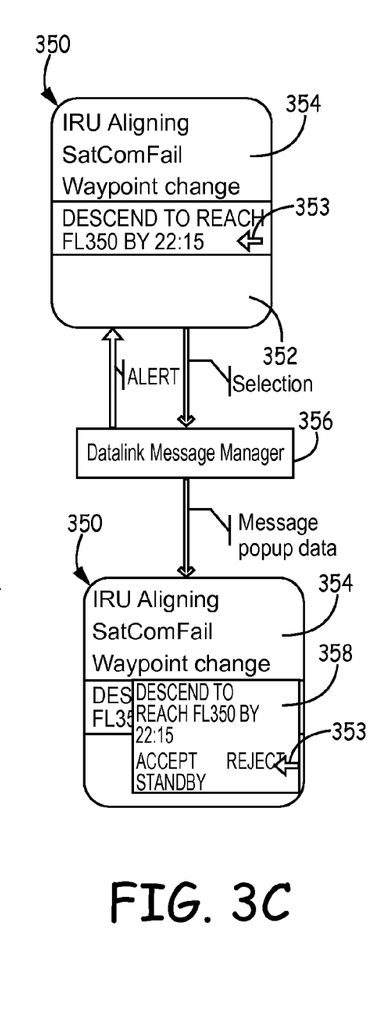

FIGS. 3A-3C illustrate various interactive FFoV display architectures that are configured for variable datalink messages according to alternative embodiments. As shown in FIG. 3A, a display unit 310, which has a touch sensitive screen 312, lists various exemplary alerts in an alerting widow 314 that are provided by a datalink message manager 316. In this embodiment, the "ATC message" (FIG. 2A) is replaced with the variable datalink message "DESCEND TO REACH FL350 BY 22:15" for example. If the variable datalink message is selected by touching screen 312 in the location where the variable datalink message is displayed, the selection is transmitted to datalink message manager 316, which generates message popup data. The message popup data is transmitted back to display unit 310 to generate a popup 318 in alerting window 314 that includes the variable datalink message along with response selections (e.g., ACCEPT, REJECT, STANDBY). The crew can choose a response selection by touching screen 312 over the appropriate response selection.

As depicted in FIG. 3B, a display unit 330 includes a set of line select buttons 332 associated with a screen 333. The display unit 330 lists various exemplary alerts in an alerting widow 334 that are provided by a datalink message manager 336. In this embodiment, the "ATC message" (FIG. 2B) is replaced with the partial variable datalink message "Descend to . . . " for example. If the partial variable datalink message is selected by pushing the corresponding line select button 332, the selection is transmitted to datalink message manager 336, which generates message popup data. The message popup data is transmitted back to display unit 330 to generate a popup 338 in alerting window 334 with the expanded message in its entirety (e.g., DESCEND TO REACH FL350 BY 22:15). The popup 338 also includes response selections (e.g., ACCEPT, REJECT, STANDBY), which can be selected by pushing the corresponding line select button 332. Alternatively, the message data can be directed to appear in an external popup 340 on another display that may execute button pushes.

As illustrated in FIG. 3C, a display unit 350, which includes a screen 352 that uses a line select cursor 353, lists various exemplary alerts in an alerting widow 354 that are provided by a datalink message manager 356. In this embodiment, the "ATC message" (FIG. 2C) is replaced with the variable datalink message "DESCEND TO REACH FL350 BY 22:15" for example. If the variable datalink message is selected by using line select cursor 353, the selection is transmitted to datalink message manager 356, which generates message popup data. The message popup data is transmitted back to display unit 350 to generate a popup 358 in alerting window 354 that includes the variable datalink message along with response selections (e.g., ACCEPT, REJECT, STANDBY). The crew can choose a response selection using line select cursor 353.

Figure 4:
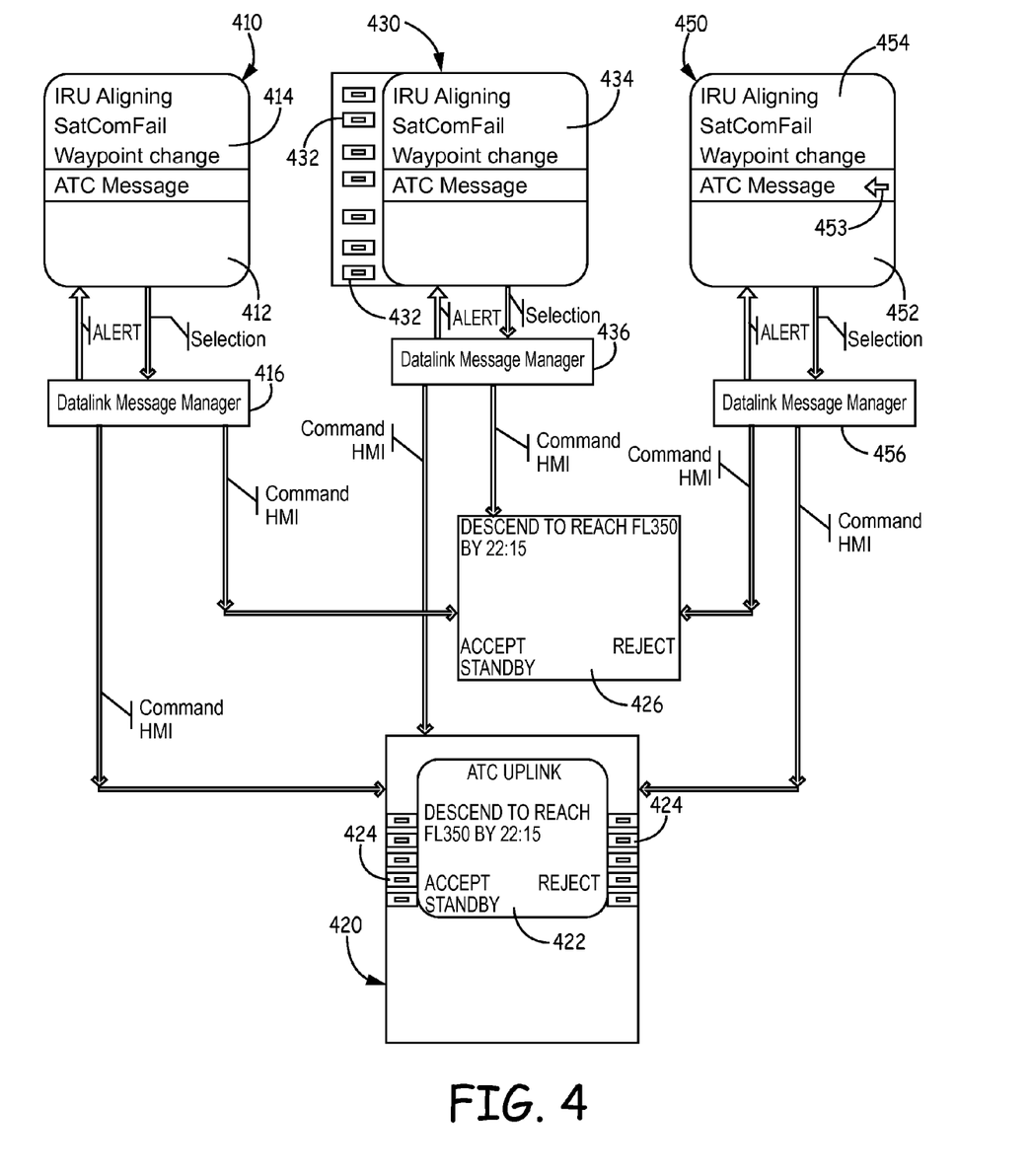
FIG. 4 illustrates various interactive FFoV display architectures that are configured for fixed datalink messages according to alternative embodiments.

FIG. 4 illustrates various interactive FFoV display architectures that are configured for fixed datalink messages according to alternative embodiments. As shown in FIG. 4, a display unit 410, which has a touch sensitive screen 412, lists various exemplary alerts in an alerting widow 414 that are provided by a datalink message manager 416. If the "ATC message" is selected by touching screen 412 at the location where the "ATC message" is displayed, the selection is transmitted to datalink message manager 416. A command HMI signal that includes message data is transmitted to an external display, such as an MCDU 420, to generate a screen 422 with the expanded message in its entirety (e.g., DESCEND TO REACH FL350 BY 22:15). The screen 422 also includes response selections (e.g., ACCEPT, REJECT, STANDBY), which can be selected with a corresponding line select button 424 on MCDU 420. Alternatively, a command HMI signal that includes message data can be transmitted from datalink message manager 416 to another external display such that a popup 426 appears with the expanded message in its entirety along with the response selections.

In an alternative embodiment depicted in FIG. 4, a display unit 430, which includes line select buttons 432, lists various exemplary alerts in an alerting widow 434 that are provided by a datalink message manager 436, including the "ATC message" fixed text. If the "ATC message" is selected by pushing the corresponding line select button 432, the selection is transmitted to datalink message manager 436. A command HMI signal that includes message data is transmitted to MCDU 420 to generate screen 422 with the expanded message in its entirety and the response selections. Alternatively, a command HMI signal that includes the message popup data can be transmitted from datalink message manager 436 to another external display that executes button pushes, such that popup 426 appears with the expanded message in its entirety along with the response selections.

In another alternative embodiment depicted in FIG. 4, a display unit 450, which includes a screen 452 that uses a line select cursor 453, lists various exemplary alerts in an alerting widow 454 that are provided by a datalink message manager 456, including the "ATC message" fixed text. If the "ATC message" is selected by the crew by using line select cursor 453, the selection is transmitted to datalink message manager 456. A command HMI signal that includes message data is transmitted to MCDU 420 to generate screen 422 with the expanded message in its entirety and the response selections. Alternatively, a command HMI signal that includes the message popup data can be transmitted from datalink message manager 456 to another external display such that popup 426 appears with the expanded message in its entirety along with the response selections.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes an alerting system for producing tactical views of datalink messages, the system comprising: a datalink application processor configured to receive and decode an uplink datalink message, the datalink application processor including a datalink message manager; a control processor in operative communication with the datalink application processor and configured to communicate with the datalink message manger; and a display unit in operative communication with the control processor and configured to show the uplink datalink message; wherein the control processor is configured receive message data from the datalink message manager and output the message data to the display unit to generate an annunciation of the datalink message; wherein the datalink message manager is configured to output display data for generating the datalink message in full based on a single forward field of view interaction by a user with the display unit.

Example 2 includes the system of Example 1, wherein the display unit comprises a touch sensitive screen.

Example 3 includes the system of Example 1, wherein the display unit includes a set of line select buttons associated with a screen.

Example 4 includes the system of Example 1, wherein the display unit includes a screen that uses a line select cursor.

Example 5 includes the system of any of Examples 1-4, wherein the annunciation is a fixed datalink message.

Example 6 includes the system of any of Examples 1-4, wherein the annunciation includes a variable datalink message.

Example 7 includes the system of any of Examples 1-6, wherein the display unit comprises a crew alerting display unit, and the datalink message in full is shown on the crew alerting display unit in a popup.

Example 8 includes the system of any of Examples 1-6, further comprising an external display unit in operative communication with the datalink application processor, wherein the datalink message in full is shown on the external display unit.

Example 9 includes the system of Example 8, wherein the external display unit comprises a forward field of view display, or a MCDU.

Example 10 includes the system of any of Examples 1-9, wherein the datalink message in full includes response selections that are selectable by the user.

Example 11 includes a method for producing tactical views of datalink messages, the method comprising: receiving an uplink signal in an aircraft, the uplink signal including a datalink message; generating an annunciation of the datalink message on a display unit in a cockpit of the aircraft; and generating the datalink message in full for viewing based on a single forward field of view interaction by a user with the display unit.

Example 12 includes the method of Example 11, wherein the display unit comprises a crew alerting display unit.

Example 13 includes the method of any of Examples 11-12, wherein the annunciation is a fixed datalink ATC message.

Example 14 includes the method of any of Examples 11-12, wherein the annunciation includes a variable datalink text ATC message.

Example 15 includes the method of Example 14, wherein the variable datalink ATC message includes variable clearance information.

Example 16 includes the method of any of Examples 11-15, wherein the datalink message in full is shown on the display unit in a popup.

Example 17 includes the method of any of Examples 11-15, wherein the datalink message in full is shown on an external display unit.

Example 18 includes the method of Example 17, wherein the external display unit comprises a forward field of view display, or a multifunction control display unit.

Example 19 includes the method of any of Examples 11-18, wherein the datalink message in full includes response selections that are selectable by the user.

Example 20 includes a method for producing tactical views of ATC datalink messages, the method comprising: receiving an uplink signal that includes an ATC datalink message in an aircraft; and generating an annunciation of the ATC datalink message, wherein the annunciation includes at least part of a variable datalink message shown on a display unit in the aircraft without any interaction by a user.

The present invention may be embodied in other forms without departing from its essential characteristics. The described embodiments are to be considered in all respects only as illustrative and not restrictive. Therefore, it is intended that this invention be limited only by the claims and the equivalents thereof.

What is claimed is:

1. A system for producing views of datalink messages, the system comprising:
   a datalink application processor configured to receive and decode an uplink datalink message, the datalink application processor including a datalink message manager;
   a control processor in operative communication with the datalink application processor and configured to communicate with the datalink message manger;
   a datalink display unit in operative communication with the datalink application processor; and
   a crew alerting display unit in operative communication with the control processor, the crew alerting display unit configured to show a visual annunciation of the uplink datalink message;
   wherein the visual annunciation includes at least part of the datalink message and is shown on the crew alerting display unit without any interaction by a user.

2. The system of claim 1, wherein the crew alerting display unit comprises a touch sensitive screen.

3. The system of claim 1, wherein the crew alerting display unit includes a set of line select buttons associated with a screen.

4. The system of claim 1, wherein the crew alerting display unit includes a screen that uses a line select cursor.

5. The system of claim 1, wherein the visual annunciation is a fixed datalink message.

6. The system of claim 1, wherein the visual annunciation includes a variable datalink message.

7. The system of claim 1, wherein the datalink message in full is shown on the crew alerting display unit in a popup after interaction by a user with the crew alerting display unit.

8. The system of claim 1, wherein the datalink message in full is shown on the datalink display unit after interaction by a user with the crew alerting display unit.

9. The system of claim 8, wherein the datalink display unit comprises a forward field of view display, or a multifunction control display unit.

10. The system of claim 7, wherein the datalink message in full includes response selections that are selectable by the user.

11. A method for producing views of datalink messages, the method comprising:
    receiving an uplink signal in an aircraft, the uplink signal including a datalink message, the aircraft including a datalink display unit in a cockpit of the aircraft, and a crew alerting display unit in the cockpit; and
    generating a visual annunciation of the datalink message on the crew alerting display unit, wherein the visual annunciation includes at least part of the datalink message and is shown on the crew alerting display unit without any interaction by a user.

12. The method of claim 11, wherein the visual annunciation is a fixed datalink Air Traffic Control (ATC) message.

13. The method of claim 11, wherein the visual annunciation includes a variable datalink ATC message.

14. The method of claim 13, wherein the variable datalink ATC message includes variable clearance information.

15. The method of claim 11, wherein the datalink message in full is shown on the crew alerting display unit in a popup after interaction by a user with the crew alerting display unit.

16. The method of claim 11, wherein the datalink message in full is shown on the datalink display unit after interaction by a user with the crew alerting display unit.

17. The method of claim 16, wherein the datalink display unit comprises a forward field of view display, or a multifunction control display unit.

18. The method of claim 15, wherein the datalink message in full includes response selections that are selectable by the user.

19. A method for producing views of Air Traffic Control (ATC) datalink messages, the method comprising:
    receiving an uplink signal that includes an ATC datalink message in an aircraft, the aircraft including a datalink display unit in a cockpit of the aircraft, and a crew alerting display unit in the cockpit; and
    generating a visual annunciation of the ATC datalink message on the crew alerting display unit, wherein the visual annunciation includes at least part of the ATC datalink message and is shown on the crew alerting display unit without any interaction by a user.

* * * * *